US012799991B2

(12) United States Patent
Jiajun et al.

(10) Patent No.: US 12,799,991 B2
(45) Date of Patent: Nov. 17, 2026

(54) BRAKING METHOD AND BRAKING SYSTEM

(71) Applicant: Haldex Brake Products AB, Landskrona (SE)

(72) Inventors: Luo Jiajun, Landskrona (SE); Christian Rylander, Landskrona (SE); Xu Junwei, Landskrona (SE)

(73) Assignee: Haldex Aktiebolag, Landskrona (SE)

( * ) Notice: Subject to any disclaimer, the term of this patent is extended or adjusted under 35 U.S.C. 154(b) by 397 days.

(21) Appl. No.: 18/538,433

(22) Filed: Dec. 13, 2023

(65) Prior Publication Data

US 2024/0198987 A1 Jun. 20, 2024

(30) Foreign Application Priority Data

Dec. 14, 2022 (CN) ........................ 202211609634.8

(51) Int. Cl.
*F16D 55/02* (2006.01)
*B60L 7/00* (2006.01)
*F16D 121/24* (2012.01)

(52) U.S. Cl.
CPC ................ *F16D 55/02* (2013.01); *B60L 7/00* (2013.01); *B60T 2201/12* (2013.01); *B60T 2270/604* (2013.01); *F16D 2121/24* (2013.01)

(58) Field of Classification Search
CPC .................................................. F16D 2121/24
See application file for complete search history.

(56) References Cited

U.S. PATENT DOCUMENTS

| | | | | |
|---|---|---|---|---|
| 6,250,436 | B1 * | 6/2001 | Oikawa | B60T 13/741 188/162 |
| 9,403,521 | B2 * | 8/2016 | Williams | F16D 65/28 |
| 9,915,308 | B2 * | 3/2018 | Masuda | F16D 55/225 |
| 10,654,454 | B2 * | 5/2020 | Ohkubo | B60L 15/2009 |
| 10,899,327 | B2 * | 1/2021 | Nishikawa | B60T 8/171 |
| 2014/0042800 | A1 * | 2/2014 | Kim | B60L 58/12 303/3 |
| 2019/0232790 | A1 * | 8/2019 | Honda | B60L 7/26 |
| 2025/0128607 | A1 * | 4/2025 | Yu | B60T 1/10 |

* cited by examiner

*Primary Examiner* — James J Taylor, II
(74) *Attorney, Agent, or Firm* — Price Heneveld LLP

(57) ABSTRACT

A braking method performed by an electro-mechanical braking system including at least one axle control unit and a plurality of electro-mechanical braking devices controlled by at least one axle control unit to switch between a state in which no friction braking is applied and a state in which friction braking is applied, including setting a brake clearance between a brake pad and a brake disc to an initial value, determining whether there is a braking requirement, determining whether regenerative braking is performed, and in response to the performing of regenerative braking, setting the brake clearance to a preset value, wherein the preset value is smaller than the initial value, the brake clearance is reduced before friction braking is required and the respond time to the friction braking requirement is shortened, thereby the pause and transition during the switch between brakings is effectively reduced.

6 Claims, 5 Drawing Sheets

BRAKING METHOD AND BRAKING SYSTEM

TECHNICAL FIELD

The present application relates to braking technology, and more particularly to electro-mechanical braking technology.

BACKGROUND ART

Chinese patent publication No. CN110103926A discloses a braking system. If an electric braking force is not required, when difference between a maximum regenerative braking force and an actual regenerative braking force is below a set difference, a piston of an electric braking device is moved to a waiting position to reduce a gap between a friction member and a rotating body; and when the difference between the two is greater than the set difference, the piston is in a retracted position with a greater gap. The technical effect that this publication intends to achieve is to reduce the gap and ensure good responsiveness when the possibility of producing the electric braking force increases. The action of clearance reduction should be performed when there is no electric braking requirement, so as to achieve the effect of rapid response. However, in the prior art, the clearance reduction is only performed when the actual regenerative braking force is close to the maximum regenerative braking force. Under the method in the prior art, there is no time to preform the action of the clearance reduction in the situation where the brake pedal is lightly pressed on followed by an emergency heavy press.

SUMMARY OF THE INVENTION

The following presents a simplified summary of one or more aspects in order to provide a basic understanding of such aspects. This summary is not an extensive overview of all contemplated aspects, and is not intended to identify key or critical elements of all aspects or define the scope of any or all aspects. The sole purpose is to provide some concepts of one or more aspects in simplified form for a more detailed description later on.

In order to overcome the above drawbacks in the prior art, the present invention provides a braking method and a braking system capable of shortening the response time of a friction braking system. In cases from light braking to emergency braking, the present invention can shorten the response time, and improve safety and brake smoothness.

According to the first aspect of the present disclosure, a braking method for a vehicle performed by an electro-mechanical braking system is provided. The vehicle includes an electro-mechanical braking system and a regenerative braking system. The electro-mechanical braking system includes at least one axle control unit, and a plurality of electro-mechanical braking devices provided at ends of wheels and driven by motors to apply friction braking forces to the wheels, and in response to a braking requirement, the electro-mechanical braking devices are controlled by the axle control unit to switch between a state in which friction braking is not applied and a state in which the friction braking is applied. The method includes: setting a brake clearance between a brake pad and a brake disc of each of the electro-mechanical braking devices to an initial value; determining whether there is a braking requirement; determining whether regenerative braking is produced by a drive motor of the regenerative braking system; and in response to producing of the regenerative braking, controlling the electro-mechanical braking device to move the brake pad, such that the brake clearance is at a preset value, wherein the preset value is smaller than the initial value.

According to the second aspect of the present disclosure, an electro-mechanical braking system is provided. The electro-mechanical braking system includes at least one axle control unit, and a plurality of electro-mechanical braking devices provided at ends of wheels and driven by motors to apply friction braking forces to the wheels, the electro-mechanical braking devices are controlled by the axle control unit to switch between a state in which friction braking is not applied and a state in which the friction braking is applied in response to a braking requirement; a memory in communication connection with the at least one axle control unit, wherein the memory stores thereon machine-executable instructions; and a processor in communication connection with the at least one axle control unit, and the memory, wherein the machine-executable instructions, when executed by the processor, cause the electro-mechanical braking system to perform the steps of the method described according to the first aspect of the present disclosure.

Compared with the prior art, in the present application, the friction braking system for a vehicle is realized by an Electro-Mechanical Braking (EMB) system. Before friction braking is required by the vehicle, the electro-mechanical braking device is controlled by the electro-mechanical braking system to reduce the brake clearance, such that the friction braking system can quickly get involved when friction braking is required. Through the application of the above-mentioned control strategy, the response time of the vehicle to the friction braking requirement is shortened, so that the connection and switch between the friction braking and the regenerative braking is smoother, and the comfort during braking is effectively improved.

BRIEF DESCRIPTION OF THE DRAWINGS

The above features and advantages of the present invention can be better understood with the reading of the detailed description of the embodiments of the present disclosure in conjunction with the following drawings. In the drawings, components are not necessarily drawn to scale, and components having similar relevant characteristics or features may have the same or similar reference numerals.

Unless specifically stated otherwise, it should be appreciated that modules/components referenced with the same/similar reference numbers across the various figures generally refer to the same modules/components.

Figure 1:
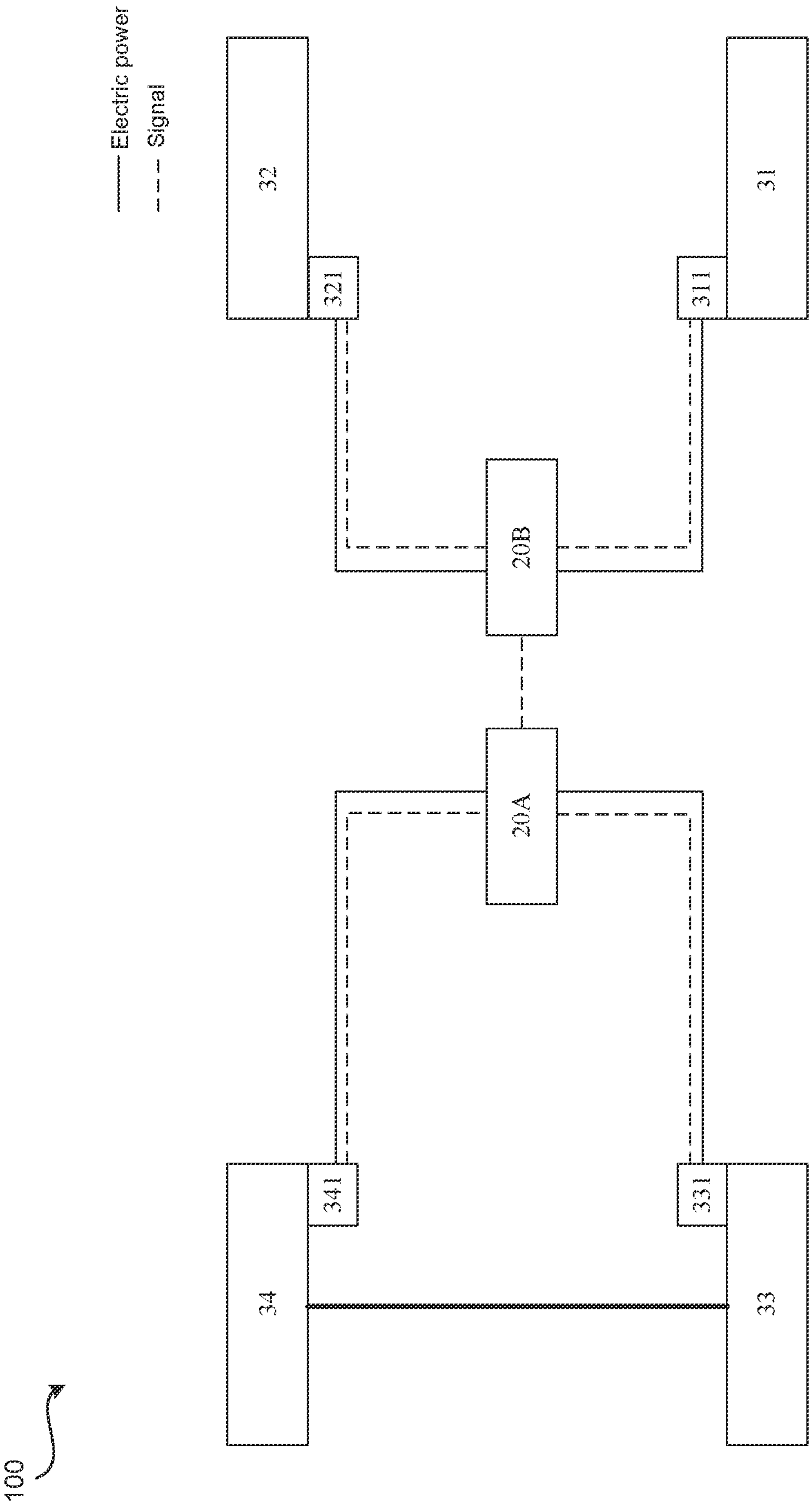
FIG. 1 illustrates a schematic architectural diagram of an electro-mechanical braking system according to some aspects of the present disclosure.

The list of reference numerals:

20A, 20B axle control unit.

31 right front wheel;
32 left front wheel;
33 right rear wheel;
34 left rear wheel; and
311, 321, 331, 341 electro-mechanical braking device.

DETAILED DESCRIPTION OF THE INVENTION

The following will refer to particular specific embodiments to illustrate the implementation modes of the present invention. Those skilled in the art can easily understand the other advantages and effects of the present invention from the content disclosed herein. While the description of the invention will be presented in connection with the preferred embodiments, it is not intended to limit the features of the invention to the implementation modes. Rather, the introduction of the invention in connection with the implementation modes is intended to cover such alternatives and modifications that may be extended based on the claims of the present invention. In the following description, numerous specific details are set forth in order to provide a thorough understanding of the present invention. The invention may be implemented without these details. Furthermore, some of the specific details are omitted from the description in order to avoid mixing or obscuring the focus of the present invention.

In a vehicle where part or all of power is provided by a drive motor, a composite braking system composed of a friction braking system providing friction braking and a regenerative braking system providing regenerative (electric feedback) braking is often used as a braking system for the vehicle. In the regenerative braking system, a drive motor is switched to an engine for operation and a rotor of the drive motor is driven to rotate by inertia of the vehicle, so that a reverse torque is produced, and a part of kinetic energy or potential energy is converted into electric energy for recovery, meanwhile a braking force is provided to the vehicle. In the friction braking system, a mechanical transmission mechanism is driven to, for example, push a brake pad to rub against a brake disc, so that a braking force is produced. In the present application, the friction braking system in the composite braking system is realized by an Electro-Mechanical Braking (EMB) system. Unlike traditional braking systems that use hydraulic pressure or air pressure as power source, in the electro-mechanical braking system, electric energy is directly used as power source, and the electric energy is converted into a friction braking force acting on wheels through a brake motor and a mechanical transmission mechanism to apply service brake and parking brake. It is a pure drive-by-wire braking system with the characteristics of high energy efficiency, rapid response, and environmental friendliness, and can be well adapted to assisted driving and unmanned driving systems.

FIG. 1 illustrates a schematic architectural diagram of an electro-mechanical braking system 100 according to some aspects of the present disclosure.

As shown in FIG. 1, the electro-mechanical braking system 100 includes two axle control units 20A and 20B, and a plurality of electro-mechanical braking devices 311, 321, 331, and 341 provided at ends of wheels and driven by motors to apply friction braking forces to the wheels 31, 32, 33, and 34.

Axle control units 20A and 20B are provided corresponding to two axles of the vehicle, and each axle control unit controls and/or supplies power to the electro-mechanical braking devices 311, 321, 331, and 341 provided at both ends of the corresponding axle. The axle control unit 20A or 20B may be mounted on the vehicle as a separately packaged device. However, it would have occurred to a person of ordinary skill in the art that internal elements can also be mounted at different positions of the vehicle in a non-independent packaging manner, and packaging manner and mounting position can be adjusted according to actual layout of the vehicle as long as the control and/or power supply for the electro-mechanical braking device can be realized.

Figure 3B:
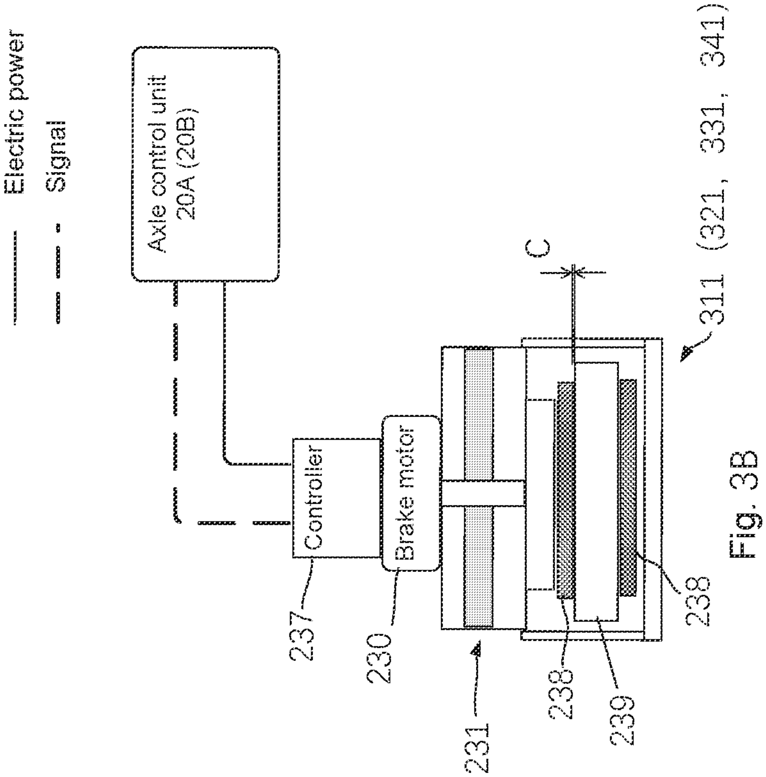
FIGS. 3A and 3B are schematic structural diagrams of an electro-mechanical braking device at an initial value of a brake clearance and a preset value of a brake clearance, respectively.
Figure 3A:
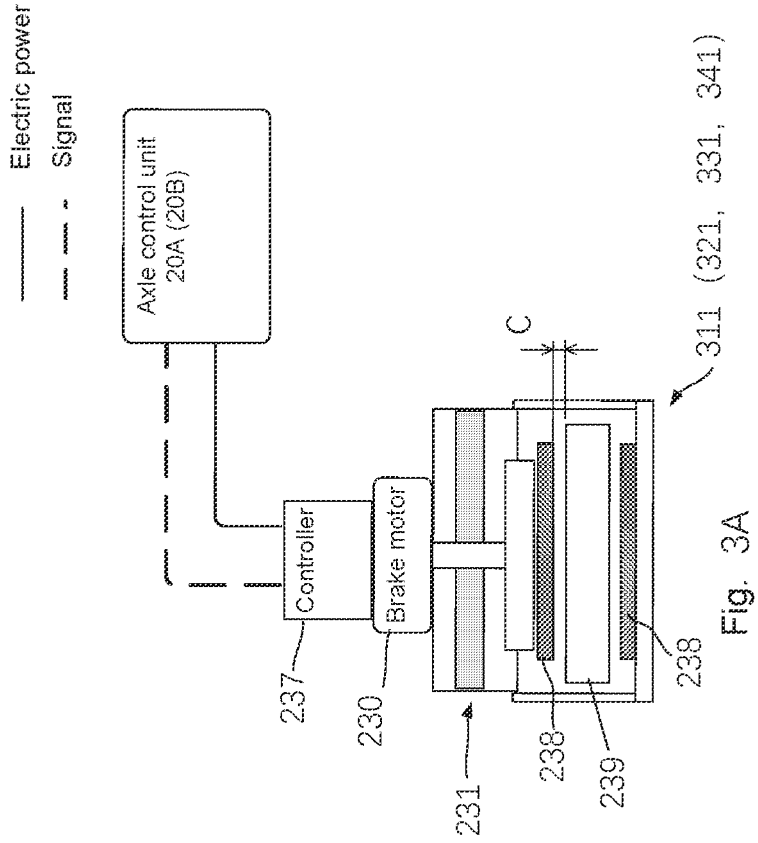

As further shown in FIG. 3A, the electro-mechanical braking devices 311, 321, 331, and 341 provided at the ends of wheels of the vehicle to provide braking forces to the wheels each include a brake motor 230 for producing a braking force, and a mechanical transmission mechanism driven by the brake motor 230. Taking a disc brake as an example, through the brake motor 230, electrical power is converted to mechanical power to drive the mechanical transmission mechanism to push the brake pad 238 toward or away from the brake disc 239, so that a friction braking force is produced or removed. The electro-mechanical braking devices 311, 321, 331, and 341 each include a brake motor controller 237 that controls rotation amount of the brake motor 230 to produce the required braking force based on the braking force requirement sent by the axle control unit 20A or 20B. In some examples, the axle control unit 20A or 20B may control the electro-mechanical braking devices 311, 321, 331, and 341 to switch between a state in which the friction braking force is not applied and a state in which the friction braking force is applied in response to the braking requirement.

The electro-mechanical braking devices 311, 321, 331, and 341 may further each include a sensor (not shown) configured to detect the state of the electro-mechanical braking device. In some examples, the sensor may include a braking force sensor configured to detect amount of the braking force applied by the electro-mechanical braking device, such as by a pressure sensor that detects the pressure between a brake pad and a brake disc. In some examples, the sensor may include a motor voltage sensor and a motor current sensor configured to detect a voltage and a current produced by the brake motor. In some examples, the sensor may include a motor rotational position sensor configured to detect rotational position and rotation amount of the brake motor. In some examples, the electro-mechanical braking devices 311, 321, 331, and 341 may each include one or more of a braking force sensor, a motor voltage sensor, a motor current sensor, a motor rotational position sensor, and/or any other type of sensors.

The electro-mechanical braking system 100 may further include a memory (not shown), having machine-executable instructions stored thereon, in communication connection with at least one axle control unit 20A or 20B; and a processor in communication connection with at least one axle control unit 20A or 20B, and the memory. The machine-executable instructions, when executed by the processor, cause the electro-mechanical braking system 100 to perform various operations.

The electro-mechanical braking system 100 as shown in FIG. 1 may be implemented in a vehicle that is partially or fully powered by a drive motor. In some examples, the electro-mechanical braking system 100 may be implemented in a battery electric vehicle or a hybrid vehicle where a drive motor is used as power source. In some examples, the vehicle may further include a drive motor controller for controlling the motor. In some examples, the drive motor controller may be implemented as an independent module. In some examples, the drive motor controller may be integrated into the axle control unit in the electro-mechanical braking system 100 or into a vehicle control unit (VCU) of the vehicle. In some examples, the vehicle may further include a drive system controller for controlling a drive system of the vehicle, and a wheel speed sensor for detecting wheel speed. In some examples, a wheel speed sensor may be arranged in correspondence with each of the wheels 31, 32, 33, and 34 of the vehicle to monitor wheel speed so as to provide vehicle reference speed, vehicle longitudinal acceleration, and other information. In some examples, the vehicle may further include a brake pedal for inputting a braking requirement and/or an accelerator pedal for inputting an acceleration requirement. In some examples, braking information and/or acceleration information may include pedal stepping depth information and/or pedal stepping speed information. In some examples, the electro-mechanical braking system 100 may be in communication connection with one or more of a drive motor controller, a drive system controller of a vehicle, a vehicle control unit (VCU), a wheel speed sensor, a brake pedal, and/or an accelerator pedal.

Figure 2:
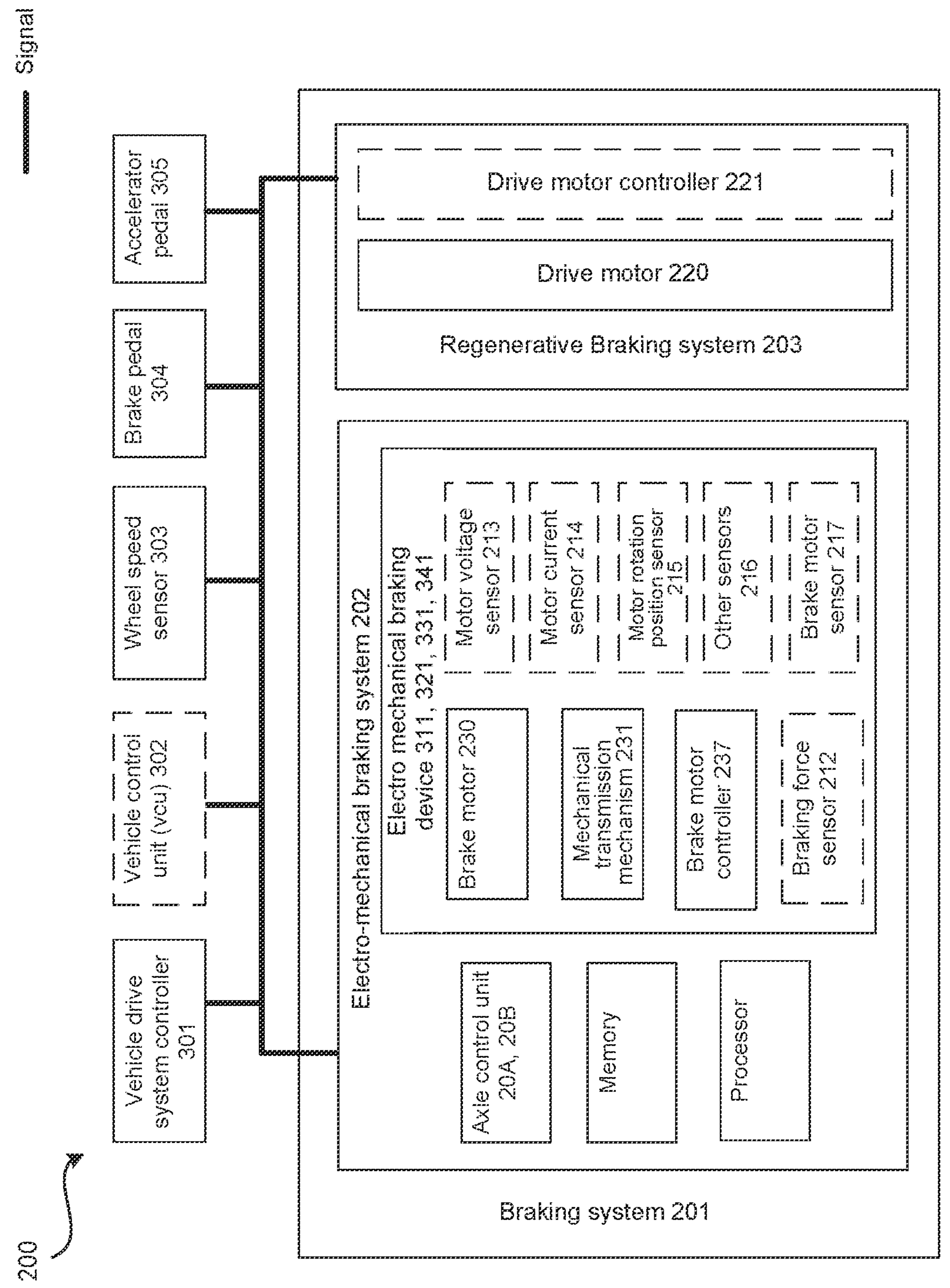
FIG. 2 illustrates a schematic architectural diagram of a system including a braking system for a vehicle and other components of the vehicle according to some aspects of the present disclosure.

Reference is next made to FIG. 2, which illustrates a schematic architectural diagram of a system 200 including a vehicle braking system and other components of the vehicle according to some aspects of the present disclosure. In an embodiment of the present application, a braking system for the vehicle may include a friction braking system providing a friction braking force and a regenerative braking system providing a regenerative braking force. In an embodiment of the present application, the friction braking system may be implemented by the electro-mechanical braking system 100 as shown in FIG. 1.

As shown in FIG. 2, the system 200 may include a braking system 201 for the vehicle. The vehicle braking system 201 may include an electro-mechanical braking system 202 that provides a friction braking force. In some examples, an electro-mechanical braking system 202 may be an example of the electro-mechanical braking system 100 as shown in FIG. 1. The electro-mechanical braking system 202 may include at least one axle control unit 20A or 20B, and electro-mechanical braking devices 311, 321, 331, and 341. In some examples, the electro-mechanical braking devices 311, 321, 331, and 341 may each include a brake motor 230, and a mechanical transmission mechanism 231. In some examples, the electro-mechanical braking devices 311, 321, 331, and 341 each include a brake motor controller 237, and may each include a braking force sensor 212, a motor voltage sensor 213, a motor current sensor 214, a motor rotational position sensor 215, and/or other sensors 216. The braking system 201 for the vehicle further includes a regenerative braking system 203. The regenerative braking system 203 includes a drive motor 220 and a drive motor controller 221. In the regenerative braking system 203, the drive motor 220 is switched to an engine for operation and a rotor of the drive motor is driven to rotate by inertia of the vehicle, so that a reverse torque is produced, and a part of the kinetic energy or potential energy is converted into electric energy for recovery, whereby a regenerative braking force is provided to the vehicle. In some examples, the drive motor controller 221 may be integrated into the axle control unit 20A or 20B in the electro-mechanical braking system 202 or a vehicle control unit (VCU) 302 in the system 200.

As shown in FIG. 2, the system 200 may further include a vehicle drive system controller 301, a vehicle control unit (VCU) 302, a wheel speed sensor 303, and a brake pedal and/or an accelerator pedal 304. In the configuration shown in FIG. 2, the axle control unit 20A or 20B is communication connection with electro-mechanical braking devices 311, 321, 331, and 341 (including the optional braking force sensor 212, motor voltage sensor 213, motor current sensor 214, motor rotational position sensor 215, and/or other sensors 216, and brake motor controllers). The axle control unit 20A or 20B is communication connection with a drive motor controller 221, a vehicle drive system controller 301, a vehicle control unit (VCU) 302, a wheel speed sensor 303, and a brake pedal and/or an accelerator pedal 304.

When braking is required, for example, when a user steps on a brake pedal, the braking system for the vehicle determines a total braking force required by the vehicle based on various factors such as current vehicle speed, depth and speed at which the user steps on the pedal, etc. If the required total braking force is small, it may be provided completely by the regenerative braking system, i.e. the electro-mechanical braking system is not required to produce a friction braking force. If the total braking force required by the vehicle exceeds an available maximum regenerative braking force, the total braking force required by the vehicle is required to be provided by both the regenerative braking force and the friction braking force. In the configuration shown in FIG. 2, the total braking force required by the vehicle may be provided by both the friction braking force provided by the electro-mechanical braking system 202 and the regenerative braking force provided by the regenerative braking system 203. During braking, distribution of the total braking force between the regenerative braking force and the friction braking force is dynamically changed. Taking a disc brake as an example, through the brake motor 230, electrical power is converted to mechanical power to drive the mechanical transmission mechanism to push the brake pad 238 toward or away from the brake disc 239 to produce the required braking force. In response to a friction braking requirement, the axle control unit 20A or 20B of the electro-mechanical braking system 202 controls rotation amount of the brake motor to push the brake pads 238 of the electro-mechanical braking devices 311, 321, 331, and 341 to rub against the brake disc 239, so that a braking force is produced and thus a friction braking force is provided to the vehicle. As shown in FIGS. 3A and 3B, as the brake pad 238 moves towards the brake disc 239, a brake clearance C decreases to 0; and when the brake clearance just decreases to 0, the brake pad 238 is in slight contact with the brake disc 239, but no friction braking force is produced; the brake motor can continue to rotate, the brake pad 238 continues to be pushed by the mechanical transmission mechanism, so that the brake pad 238 is pressed tightly against the brake disc 239, and the friction braking force is produced. As the brake pad 238 moves away from the brake disc 239, the brake clearance C increases. The time between the receipt of the friction braking requirement and the application of the friction force to the wheels in the electro-mechanical braking system affects the smoothness of switching between braking modes, thus affecting the comfort during braking.

Figure 4:
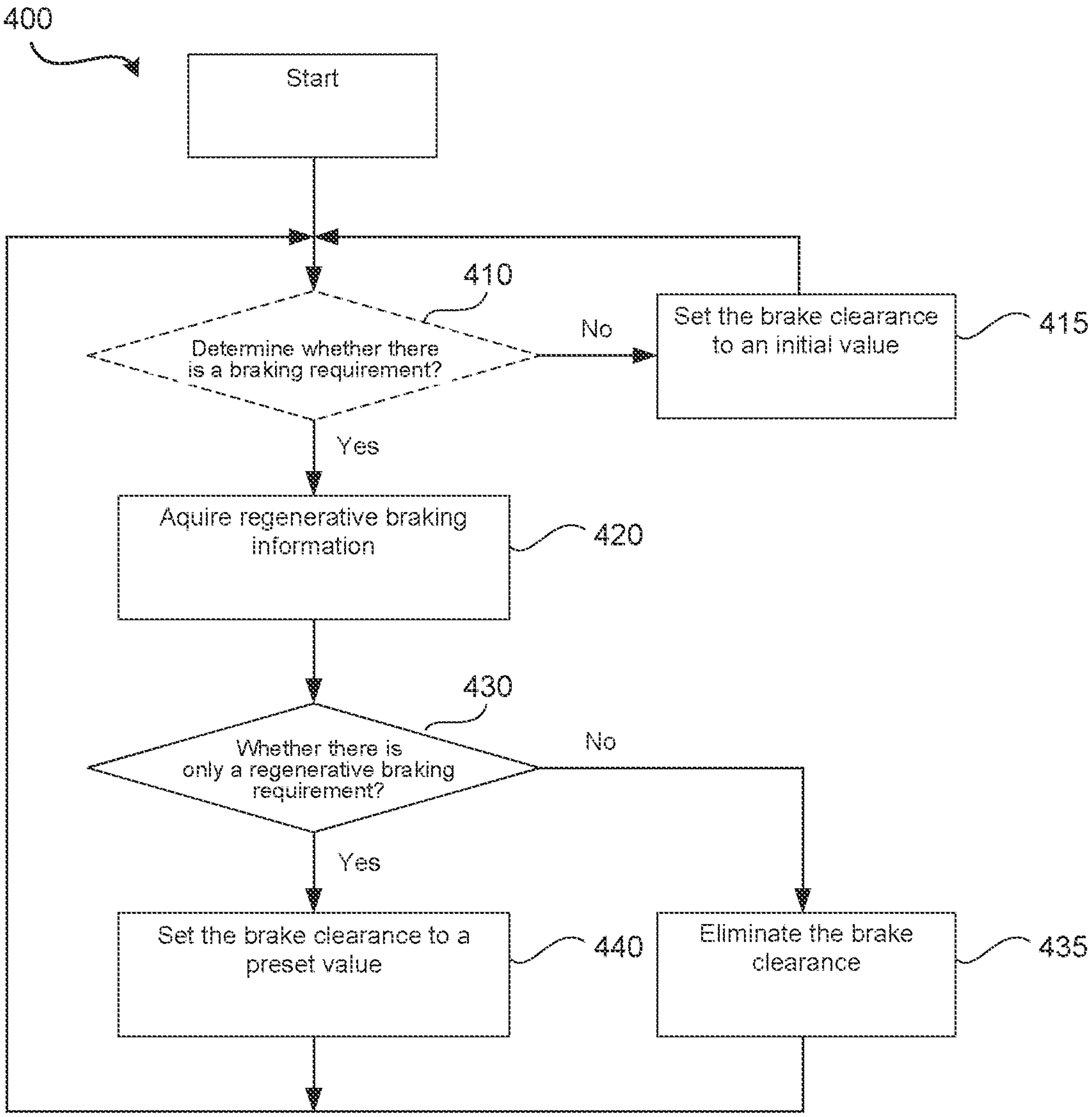
FIG. 4 shows a flowchart of a braking method according to some aspects of the present disclosure.

A braking method 400 according to some aspects of the present invention is described below in conjunction with FIGS. 2 to 4. In some examples, the method 400 may be performed, for example, by the electro-mechanical braking system 100 or 202 described with reference to FIGS. 1 and 2 providing a friction braking force.

The method 400 may include: step 420, acquiring regenerative braking information. In some examples, step 420 may include obtaining regenerative braking information by the axle control unit 20A or 20B from one or more of the drive motor controller 221, the vehicle drive system controller 301, and the vehicle control unit 302. In some examples, the regenerative braking information may include information on whether a regenerative braking force was applied and/or information on magnitude of the regenerative braking force. The method for determining whether a regenerative braking force was applied includes: (1) the wheels are driven to move by the drive motors, the drive motor shaft is subjected to a positive torque from the drive motor and a negative torque from the wheels, and when regenerative braking is performed, the drive motor stops producing a driving force for movement, and the motor shaft is driven in a positive direction by inertia of the wheels; and therefore, torques in opposite directions are received by the motor shaft before and after the regenerative braking, and once direction of the torque received by the drive motor shaft is measured to change from a negative direction to a positive direction by the torque sensor, it means that the regenerative braking is performed; and (2) when a drive power supply is turned off, the drive power supply neither output current nor produce electromotive force, the motor shaft is driven to rotate by inertia of the wheels, so that regenerative current and electromotive force are produced, and once the regenerative current and electromotive force are measured by an ammeter or an electromotive force sensor, it means that the regenerative braking is performed.

The method 400 may include: step 440, in response to the regenerative braking force being applied to the wheels, controlling, by the axle control unit 20A or 20B, rotation amount of the brake motor 230 to drive the mechanical transmission mechanism 231 to operate until the brake clearance C between the brake pad 238 and the brake disc 239 reaches a preset value, which is smaller than an initial value of the brake clearance when braking is not required.

The preset value of the brake clearance C is in a range of $0 \leq C \leq 0.1$ mm. Here, C=0 means that the brake pad is just moved to a position where it is in slight contact with the brake disc, and there is no pressure or friction therebetween. This position may be determined by the braking force sensor 212, the motor voltage sensor 213, the motor current sensor 214, the motor rotational position sensor 215, and/or other sensors 216 as shown in FIG. 2. Illustratively, the braking force sensor, such as a pressure sensor, is used to detect the pressure between the brake pad and the brake disc. When the brake pad is not in contact with the brake disc, no signal is output by the pressure sensor. When the brake pad is in contact with the brake disc, the pressure sensor outputs a pressure signal. In this case, it can be determined that the electro-mechanical braking device is driven to the position of slight contact. In addition, the signals output by the motor voltage sensor 213, the motor current sensor 214, and the motor rotational position sensor 215 may be referred to for checking to improve accuracy of position confirmation.

In some examples, the method 400 may optionally include, prior to step 420: step 410, determining whether braking is required. In some examples, step 410 may include determining, by the axle control unit 20A or 203, the total braking force required by the vehicle based on various factors such as braking information and/or acceleration information obtained from the brake pedal and/or accelerator pedal 304, the current vehicle speed obtained from the wheel speed sensor 303, etc. In some examples, determining whether braking is required may include determining, by the axle control unit 20A or 20B, distribution of the total braking force between the friction braking force and the regenerative braking force. In some examples, determining whether braking is required may include determining at least one of the following: applying the regenerative braking force is required but applying the friction braking force is not required, switching from the regenerative braking force to the friction braking force is required, removing only the friction braking force but still applying the regenerative braking force is required, completely removing the braking force is required, etc. In some examples, the method 400 may optionally include: step 435, in response to a braking requirement of switching from the regenerative braking force to the combination of the regenerative braking force and the friction braking force, controlling the electro-mechanical braking device to eliminate the brake clearance and move the brake pad to press tightly against the brake disc, so that the friction braking force is produced, and the electro-mechanical braking device is in a compression position. In some examples, the method 400 may additionally include in response to a braking requirement of removing only the friction braking force but still applying the regenerative braking force, controlling the electro-mechanical braking device to move to a position with the clearance of the preset value. In some examples, the method 400 may additionally and/or alternatively include, in response to the braking requirement of completely removing the braking force, rotating the brake motor in a reverse direction to retract the electro-mechanical braking device from the compression position or the position with the clearance of the preset value to the position with the clearance of the initial value, as shown in step 415.

In some examples, the steps of the method 400 are repeated during a braking process. In some examples, during the period that the brake pedal is stepped on and/or the accelerator pedal is released, the steps of the method 400 are repeated at a certain time interval, e.g. the steps of the method 400 are performed once every 10 ms. Those skilled in the art should understand that the time interval for performing the steps of the method 400 may be determined in any other suitable manner without departing from the scope of the present disclosure.

Figure 5:
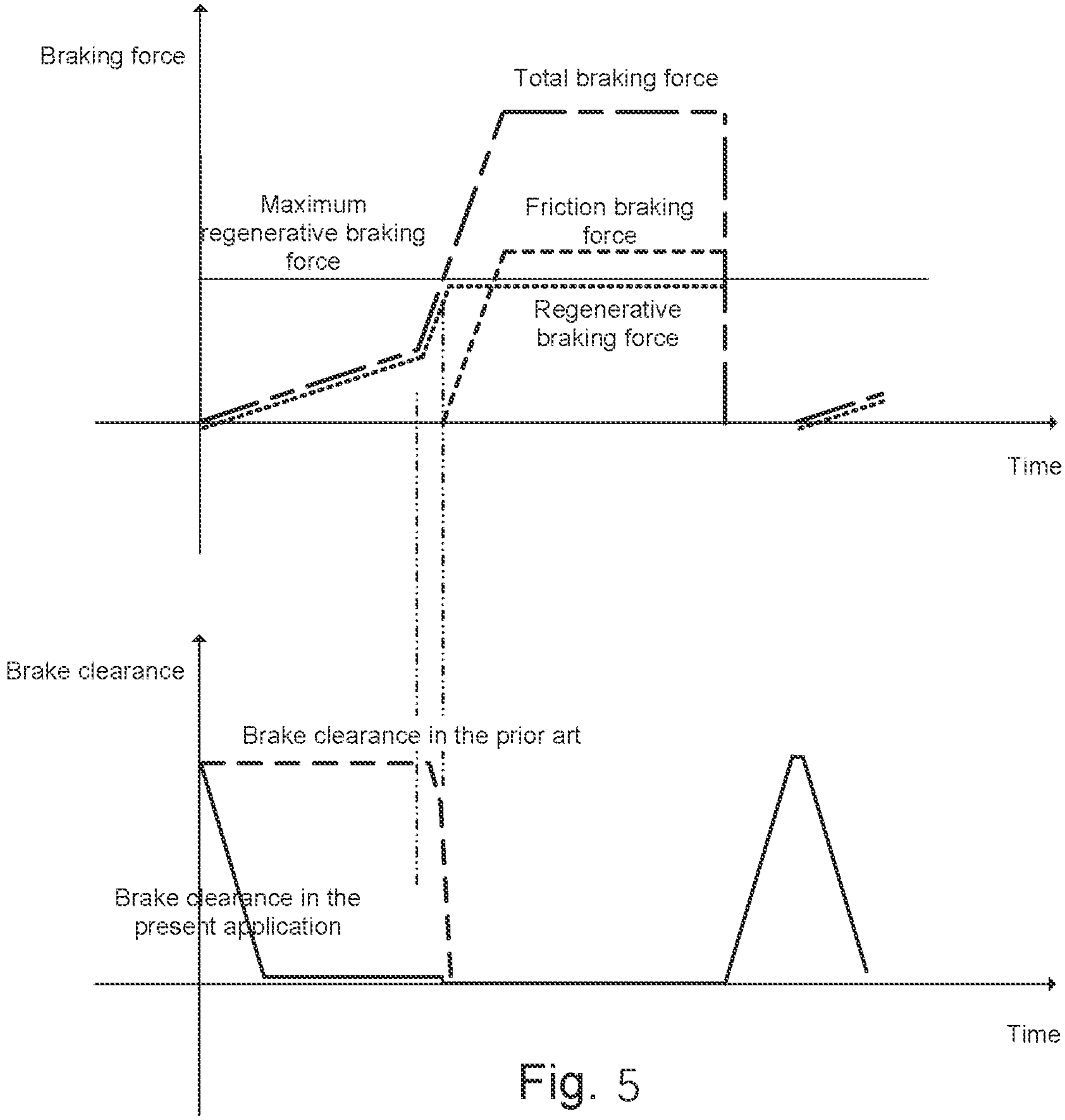
FIG. 5 illustrates a plot of a braking force and a brake clearance during composite braking according to some aspects of the present disclosure.

According to various embodiments of the present application, when friction braking is not required, the electro-mechanical braking device is retracted to the position with the clearance of the preset value, so that the electro-mechanical braking system can rapidly preform friction braking when friction braking is required. Not only the response time is shorten, but also the brake motor is prevented from driving the transmission mechanism 231, in the situation where the brake pedal is lightly pressed on followed by an emergency heavy press, causing the brake pad 238 moves quickly towards the brake disc 239 and thus the brake pad 238 collides with the brake disc 239, which makes passengers feel a sense of jerking. The horizontal axis of the figure in the upper half of FIG. 5 represents time and the vertical axis represents the braking force. It can be seen that the total braking force goes through two stages of linear change with different slopes and then enters a stable stage. The regenerative braking force goes through a stage of linear growth and then reaches and remains at the level of the maximum regenerative braking force. The braking process shown in FIG. 5 may include: a first stage, in which the regenerative braking force is provided only by the regenerative braking system to meet the total braking force requirement, and the curve of the regenerative braking force is coincide with the curve of the total braking force (for clarity, the two curves are shown separately in the figure in a schematic manner); and a second stage, with the continuous increasing of the total braking force requirement, after the friction braking force is produced, the friction braking force provided by the friction braking system (in the present application, the electro-mechanical braking system) is added to the regenerative braking force provided by the regenerative braking system to meet the total braking force requirement. The response time between the first stage and the second stage is caused by the time required for the friction braking system to move from the position with the clearance of the preset value to the compression position. The differences between the present invention and the prior art can be more clearly observed in the situation where the brake pedal is lightly pressed on followed by an emergency heavy press.

In an embodiment according to the present application represented by dot dash lines, the friction braking system (i.e. the electro-mechanical braking system) is controlled to reach and maintain at the position with the brake clearance of the preset value before the friction braking force is required (i.e. when the regenerative braking force can meet the total braking force requirement required by the vehicle), so that the friction braking force can be produced by the electro-mechanical braking device in a shorter time when the friction braking force is required, and the response time of the friction braking system is significantly shortened.

Technicians in this field can understand that various explanatory logic blocks, modules, circuits, and algorithm steps described in conjunction with the disclosed embodiments herein can be implemented as electronic hardware, computer software, or a combination of the two. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Technicians can achieve the described functionality in different ways for each specific application, but such implementation decisions should not be interpreted as departing from the scope of the present invention.

The various explanatory logical blocks, and circuits described in connection with the embodiments disclosed herein may be implemented or performed with a general-purpose processor, a digital signal processor (DSP), an application-specific integrated circuit (ASIC), a field programmable gate array (FPGA) or other programmable logic devices, discrete gate or transistor logic, discrete hardware components, or any combination thereof designed to perform the functions described herein A general-purpose processor may be a microprocessor. But in the alternative, the processor may be any conventional processor, controller, microcontroller, or state machine. A processor may also be implemented as a combination of computing apparatuses, e.g. a combination of a DSP and a microprocessor, a plurality of microprocessors, one or more microprocessors in conjunction with a DSP core, or any other such configurations.

The steps of a method or an algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, a register, a hard disk, a removable disk, a CD-ROM, or any other form of storage media known in the field. An exemplary storage medium is connected to the processor such that the processor can read information from, and write information to, the storage medium. In the alternative, the storage medium may be integral to the processor. The processor and the storage medium may reside m an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to this disclosure will be apparent to those skilled in the art, and the universal principles defined herein can be applied to other variants without departing from the spirit or scope of this disclosure. Therefore, this disclosure is not intended to be limited to the examples and designs described herein, but should be granted the widest scope consistent with the principles and novel features disclosed herein.

The invention claimed is:

1. A braking method for a vehicle performed by an electro-mechanical braking system, the vehicle comprising the electro-mechanical braking system and a regenerative braking system, the electro-mechanical braking system comprising at least one axle control unit and a plurality of electro-mechanical braking devices provided at ends of wheels and driven by motors to apply friction braking to the wheels, the electro-mechanical braking devices are controlled by the at least one axle control unit to switch between a state in which the friction braking is not applied and a state in which the friction braking is applied in response to a braking requirement, wherein the method comprises:

setting a brake clearance between a brake pad and a brake disc of each of the electro-mechanical braking devices to an initial value;

determining whether there is the braking requirement;

determining whether regenerative braking is produced by a drive motor of the regenerative braking system;

in response to producing of the regenerative braking, controlling the electro-mechanical braking devices to move the brake pads, such that the brake clearances are at a preset value, wherein the preset value is smaller than the initial value; and in case that the maximum regenerative braking does not meet the braking requirement, controlling the electro-mechanical braking devices to move the brake pads, such that the brake pads are pressed tightly against the brake discs and the friction braking is produced until a sum of the regenerative braking and the friction braking meets the braking requirement;

wherein, in case that the maximum regenerative braking meets the braking requirement after the friction braking is performed, the electro-mechanical braking devices are controlled to move the brake pads, such that the brake clearances are Increased to the preset value.

2. The method of claim 1, further comprising:

in response to determining that there is no braking requirement, controlling the electro-mechanical braking devices to move the brake pads, such that the brake clearances are of the initial value.

3. The method of claim 1, wherein determining whether the regenerative braking is produced by the drive motor of the regenerative braking system comprises:

measuring whether torque direction of a drive motor shaft of the drive motor of the regenerative braking system changes from a negative direction to a positive direction; or measuring a regenerative current or electromotive force when a drive power supply is turned off.

4. The method of claim 1, wherein the preset value C of the brake clearances meets $0<C\leq 0.1$ mm.

5. The method of claim 1, wherein, in case that the preset value C of the brake clearances are equal to 0, controlling the electro-mechanical braking devices to make the brake pads in slight contact with the brake discs without producing the friction braking.

6. The electro-mechanical braking system, comprising:

the at least one axle control unit;

the plurality of electro-mechanical braking devices provided at the ends of the wheels and driven by the motors to apply the friction braking forces to the wheels, the electro-mechanical braking devices are controlled by the at least on axle control unit to switch between the state in which the friction braking is not applied and the state in which the friction braking is applied in response to the braking requirement;

a memory in communication connection with at least one brake controller, wherein the memory stores thereon machine-executable instructions; and a processor in communication connection with the at least one axle control unit, and the memory, wherein the machine-executable instructions, when executed by the processor, cause the electro-mechanical braking system to perform operations of the method of claim 1.

* * * * *